C. H. AMES.
Car-Couplings.

No. 154,628.

Patented Sept. 1, 1874.

WITNESSES:
A. W. Almqvist
J. Sedgwick

INVENTOR:
C. H. Ames
BY
Munn & Co.
ATTORNEYS.

UNITED STATES PATENT OFFICE.

CHARLES H. AMES, OF CORRY, PENNSYLVANIA.

IMPROVEMENT IN CAR-COUPLINGS.

Specification forming part of Letters Patent No. 154,628, dated September 1, 1874; application filed December 20, 1873.

*To all whom it may concern:*

Figure 1:
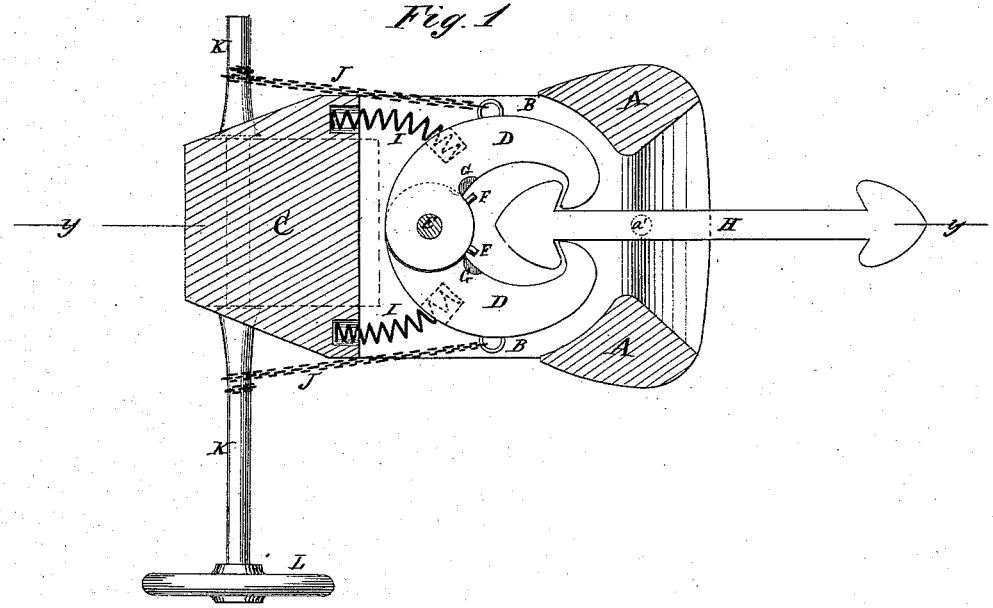
Figure 2:
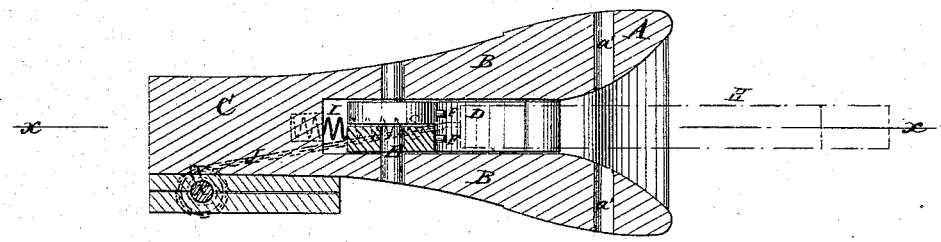

Be it known that I, CHARLES H. AMES, of Corry, in the county of Erie and State of Pennsylvania, have invented a new and useful Improvement in Car-Couplings, of which the following is a specification:

Figure 1 is a detail section of my improved car-coupling, taken through the line *x x*, Fig. 2. Fig. 2 is a detail section of the same, taken through the line *y y*, Fig. 1.

Similar letters of reference indicate corresponding parts.

My invention has for its object to furnish an improved car-coupling, which shall be so constructed as to couple automatically as the cars are run together, which may be readily uncoupled without going between the cars, can be coupled with an ordinary link and pin, and which shall be simple in construction and reliable in use.

The invention will first be fully described, and then pointed out in the claim.

A represents the draw-head, which is formed upon or firmly secured to the forward ends of the two parallel plates B, which are secured to or formed upon the forward end of the draw-bar C, which is connected with the car-frame in the ordinary manner. The mouth of the draw-head is made hopper-shaped, and its cavity upon the inner side of its throat is so formed as to correspond with the space between the plates B. The space between the plates B is made open at its sides, and of such a depth as to give space for the two hooks D. The hooks D are made of semicircular form, and their rear ends are overlapped, are halved to each other, and have a hole formed through them to receive the pin or bolt E, by which they are secured and pivoted to and between the plates B. To the forward side of the pivoted end of each of the hooks D is attached a pin, F, which strikes against the body of the other hook, or against a leather or rubber cushion, G, attached to said body, to prevent the forward or hook ends of the said hooks D from striking against each other, and to hold them at such a distance apart that the arrow-head of the entering coupling-bar H may force them apart and pass between them. The hooks D are forced and held toward each other by the springs I, the forward ends of which are connected with the outer or convex edges of the hooks D, and their rear ends are connected with the draw-bar C. The springs I are so arranged as to be covered and protected by the plates B. To the outer or convex edges of the hooks D are secured the forward ends of two short chains, J, the rear ends of which are attached to a short shaft, K, which works in bearings formed upon or attached to the draw-bar C, and which has a hand-wheel, L, attached to one or both its ends, for convenience in turning it.

By this construction, by turning the shaft K, the chains J will be wound upon it, drawing the hooks D apart and releasing the coupling-bar H, thus enabling the cars to be uncoupled without passing between them.

*a'* is a vertical hole formed through the forward part of the bumper-head A, to receive an ordinary coupling-pin to couple with the ordinary link-and-pin coupling, when desired.

I am aware that two hooks pivoted upon the same pin, and held together by springs, are not new, and I do not desire to broadly claim such.

Having thus described my invention, I claim as new and desire to secure by Letters Patent—

The combination of the semicircular hooks D, pivot E, pins F, cushions G, springs I, chains J, and shaft K, substantially as shown and described.

CHARLES H. AMES.

Witnesses:
G. W. H. READ,
CHAS. A. TWINING.